(12) United States Patent
Haj-Maharsi

(10) Patent No.: US 9,835,136 B2
(45) Date of Patent: Dec. 5, 2017

(54) SYSTEM AND METHOD FOR EXTENDING THE OPERATING LIFE OF A WIND TURBINE GEAR TRAIN BASED ON ENERGY STORAGE

(71) Applicant: VESTAS WIND SYSTEMS A/S, Aarhus N (DK)

(72) Inventor: Mohamed Haj-Maharsi, Cypress, TX (US)

(73) Assignee: VESTAS WIND SYSTEMS A/S, Aarhus N (DK)

(*) Notice: Subject to any disclaimer, the term of this patent is extended or adjusted under 35 U.S.C. 154(b) by 79 days.

(21) Appl. No.: 14/646,280

(22) PCT Filed: Nov. 26, 2012

(86) PCT No.: PCT/IB2012/056747
§ 371 (c)(1),
(2) Date: May 20, 2015

(87) PCT Pub. No.: WO2013/046193
PCT Pub. Date: Apr. 4, 2013

(65) Prior Publication Data
US 2015/0292484 A1    Oct. 15, 2015

Related U.S. Application Data

(60) Provisional application No. 61/538,955, filed on Sep. 26, 2011.

(51) Int. Cl.
*F03D 7/02* (2006.01)
*F03D 9/00* (2016.01)
(Continued)

(52) U.S. Cl.
CPC .............. *F03D 7/0292* (2013.01); *F03D 9/10* (2016.05); *F03D 9/257* (2017.02);
(Continued)

(58) Field of Classification Search
CPC .......... F03D 7/0292; F03D 9/005; F03D 9/10; F05B 2260/80; F16H 2057/012; F16H 57/01; Y02E 10/723
(Continued)

(56) References Cited

U.S. PATENT DOCUMENTS

2003/0227172 A1  12/2003  Erdman et al.
2010/0138058 A1   6/2010  Kirchner et al.
(Continued)

FOREIGN PATENT DOCUMENTS

EP    2072813 A2    6/2009
EP    2267306 A2   12/2010

OTHER PUBLICATIONS

Soeprijanto A. et al.: "Generator Angle Difference Monitoring System to Ensure Power Transmission Steady State Stability Based on Neural Network", Proceedings of 15th Indonesian Scientific Conference in Japan, Aug. 5, 2006, pp. 88-95.
(Continued)

*Primary Examiner* — Kenneth M Lo
*Assistant Examiner* — Yuhui R Pan
(74) *Attorney, Agent, or Firm* — Patterson + Sheridan, LLP

(57) ABSTRACT

A wind park controller and control method for a wind park (10) are described. The wind park comprises a plurality of wind turbines (20) and an Energy Storage System (24) connected to one another by means of a low voltage power network (22, 25), which is in turn coupled to the grid. The controller determines a number of operating parameters of the wind turbine gearbox or drive train, and calculates a gearbox or drive train health metric. This can include a measure of the gearbox lifetime. The controller also determines one or more power characteristics of the wind turbine generator or the point of common coupling (26) to determine a power mismatch indication. Based on the power mismatch indication and said gearbox or drive train health metric, the controller determines a power command for the Energy Storage System and wind turbines based to improve the gearbox health and lifetime.

18 Claims, 6 Drawing Sheets

(51) Int. Cl.
*F03D 9/02* (2006.01)
*F16H 57/01* (2012.01)
*F03D 9/10* (2016.01)
*F03D 9/25* (2016.01)

(52) U.S. Cl.
CPC .... *F05B 2260/80* (2013.01); *F16H 2057/012* (2013.01); *Y02E 10/723* (2013.01)

(58) Field of Classification Search
USPC .......................................................... 290/44
See application file for complete search history.

(56) References Cited

U.S. PATENT DOCUMENTS

| | | | |
|---|---|---|---|
| 2010/0138267 A1* | 6/2010 | Vittal | G05B 23/0283 702/184 |
| 2011/0089693 A1* | 4/2011 | Nasiri | F03D 7/0272 290/44 |
| 2011/0109085 A1* | 5/2011 | Nelson | H02J 3/24 290/44 |
| 2013/0221671 A1* | 8/2013 | Yasugi | F03D 7/0284 290/44 |

OTHER PUBLICATIONS

International Search Report for PCT/IB2012/056747, dated May 6, 2013.
Danish Search Report for PA 2011 70530, dated May 11, 2012.

* cited by examiner

SYSTEM AND METHOD FOR EXTENDING THE OPERATING LIFE OF A WIND TURBINE GEAR TRAIN BASED ON ENERGY STORAGE

This invention relates to a system and method for extending the operating life of a wind turbine gear train based on the use of an energy storage system, an in particular to a wind park controller and control method for controlling a plurality of wind turbines accordingly.

Wind turbines convert the kinetic energy of the wind into electrical energy for supply at an output terminal, and increasingly are being used in both domestic and industrial generation, as well as for supplying electricity to the national electricity grid. Wind turbines operated by an electricity generation company are typically located at sites that present favourable wind conditions, such as land based turbines near to coastlines or in hilly areas, or off-shore wind turbines based at sea. As such sites are usually in locations remote to existing infrastructure, the maintenance of wind turbines at these sites can become difficult and costly. Generally, there is therefore a desire to ensure that wind turbines operate efficiently and, where possible, with the minimum of repair and maintenance being required.

FIG. 1 illustrates an example horizontal axis wind turbine 1. The wind turbine 1 comprises a wind turbine tower 2 on top of which a wind turbine nacelle 3 having a rotor 4 is mounted. The wind turbine rotor 4 comprises a rotor hub 5, supporting at least one rotor blade 6. The rotor 4 is connected to the front of the nacelle 3, and turns around the hub 5 under the influence of a force provided by the incident wind.

A main drive shaft in the nacelle connects the rotor of the wind turbine to a gear box, which in turn drives a shaft that turns the rotor in an electrical generator. The role of the gear box is to couple the low-speed but high-torque drive shaft of the wind turbine rotor with the high-speed and low-torque rotor of the generator. In steady state operation, the mechanical torque applied to the drive shaft, gearbox and rotor shaft is balanced by the torque due to the electrical and magnetic excitation field of the generator. As the electrical and magnetic field of the generator depends on the voltage and frequency characteristics of the grid, changes in the grid characteristics affect the torque exerted by the generator field on the rotor, which then feed back to the gear box. Similarly, changes in the wind speed at the wind rotor, particularly wind gusts, cause the mechanical torque applied to the gearbox by the drive shaft to vary, leading to an imbalance with the torque due to the generator field.

Although any torque imbalance arising from wind gusts or power system deviations is usually short-lived, while an imbalance does exist, mechanical stress is applied to the drive and rotor generator shafts, and to the gearbox. As the mechanical stress is cumulative, its effect is a measurable as a reduction in lifetime of the gearbox.

We have appreciated therefore that it would be desirable to provide a system and method for mitigating torque imbalance at the gearbox, or in the wind-rotor generator drive train, and therefore extend the lifetime of the mechanical components.

SUMMARY OF THE INVENTION

The invention is defined in the independent claims to which reference should now be made. Advantageous features are set forth in the dependent claims.

In a first aspect of the invention, a wind park control system for a wind park is provided. The wind park comprises a plurality of wind turbines and an Energy Storage System connected to one another by means of a low voltage power network, wherein the low voltage power network is coupled to the grid and the plurality of wind turbines each respectively comprise a drive train and gear box connected between a rotor of the wind turbine and a generator of the wind turbine. The wind park control system comprises one or more environmental sensors located in at least a first wind turbine, arranged to determine one or more environmental operating parameters of the wind turbine drive train or gear box; one or more power sensors located in at least the first wind turbine or on the low voltage power network arranged to determine a power mismatch indication between the generator rotor angle and the low voltage power network and output the power mismatch indication to the wind park controller; a controller adapted to receive said one or more determined operating parameters and said power mismatch indication, to determine a gearbox or drive train health metric based on said one or more determined operating parameters, and determine a power command for the Energy Storage System and wind turbines based on said power mismatch indication and said gearbox or drive train health metric.

By using the gearbox or drive train health metric, the controller can ensure that the wind park meets both the power demands from the utility operator and the grid, while stabilising the local wind park against power imbalances. Furthermore, the wind turbine response can be carefully regulated in order to protect the gearbox and drive train from undue wear and tear caused by power imbalances in the system, which though compensated will still persist momentarily. In particular, where the wind turbines in the wind park are required to provide additional power to meet a power reference command, the controller can determine whether to use power from the Energy Storage System, thereby removing the need for certain of the wind turbines to operate or at least scaling down the magnitude of the response required from the turbines themselves.

In one embodiment, the controller determines said gearbox or drive train health metric based on said one or more operating parameters, said operating parameters including the torque, acoustic data, vibrational data, speed data, position data, strain data or temperature data of one or more gearbox or drive train components.

Using the environmental sensors located on the gearbox and/or drive train components of individual wind turbines, the controller can build up an accurate picture of the current gearbox or drive train health. The resulting metric can be used in various ways to improve the operation of the wind park as a whole, as well as to reduce the need for maintenance operations.

In one embodiment, the controller stores one or more historical time sequences for pitch control commands, wind brake commands and start-up or shut-down commands for each of the wind turbines, and the calculation of the gearbox health and drive train metric is based on one or more of said historical time sequences.

Using this information, wind turbines which have used less frequently in the past can be selected for dispatch when the power supplied by the wind farm needs to be ramped up or down.

In one embodiment, the gearbox or drive train health metric includes an estimation of gearbox lifetime. In this way, the controller can monitor the wind turbines in the park and seek to ensure though selection of particular wind turbines over others that the lifetime of the wind turbines is largely uniform across the park. This greatly improves the efficiency of the park as individual wind turbines are unlikely to need sporadic repair or replacement, and maintenance operations can more easily be scheduled for the wind park as a whole.

In one embodiment, the power mismatch indication is expressed as a delta angle, equal to the difference in rotor angle of the generator and the system phase angle of the power network. This value gives a direct measure of the resulting strain on the gearbox or drive train components, and can also be used in the calculation of the gearbox or drive train health metric.

In one embodiment, the controller is operable to determine a power command for the Energy Storage System, such that the delta angle is restored to a zero value. This restores power stability in the network of the wind park thereby minimising a mismatch in the load torque on the generator.

In one embodiment, the controller is operable to determine a power command for the wind turbines based on the power available from the Energy Storage System and said gearbox or drive train health metric. In this way, the controller can determine whether to use power from the Energy Storage System or use power from the wind turbines, thereby removing the need for certain of the wind turbines to operate or at least scaling down the magnitude of the response required from the turbines themselves.

In one embodiment, the wind park controller stores information assigning each wind turbine in the plurality of wind turbines to a separate group, and issues power reference commands to respective wind turbines based on the group to which that wind turbine is allocated. In this way, the wind park can be zoned according to the operational wear and tear likely to be faced by the respective wind turbines, according to their respective position in the park in relation to the prevailing wind direction and any other relevant environmental factors. Each of the zones can then be controlled according to a different regime of power reference commands.

In one embodiment, the wind park controller stores said gearbox or drive train health metric for each wind turbine, and issues power reference commands to respective wind turbines based on the gearbox or drive train health metric. In this way the controller can adapt the power references to suit individual wind turbines.

Although these features can be thought of as separate embodiments, their combination with one another in a single embodiment is also contemplated.

A corresponding method and computer program are also provided.

BRIEF DESCRIPTION OF THE DRAWINGS

Preferred embodiments of the invention will next be described, by way of example, and with reference to the drawings in which.

DETAILED DESCRIPTION

Figure 1:
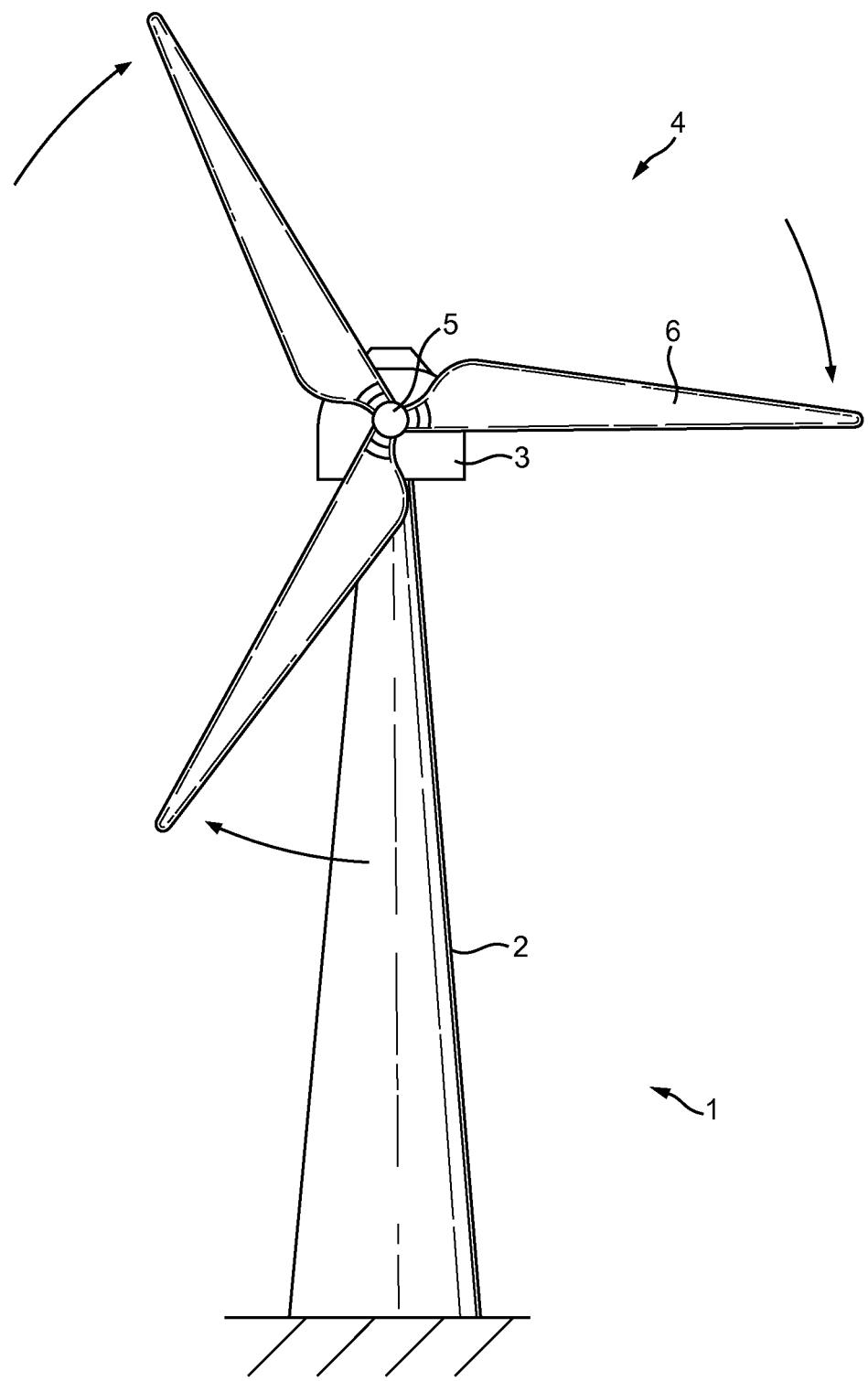
FIG. 1 is an illustration of a known three blade horizontal axis wind turbine.
Figure 2:
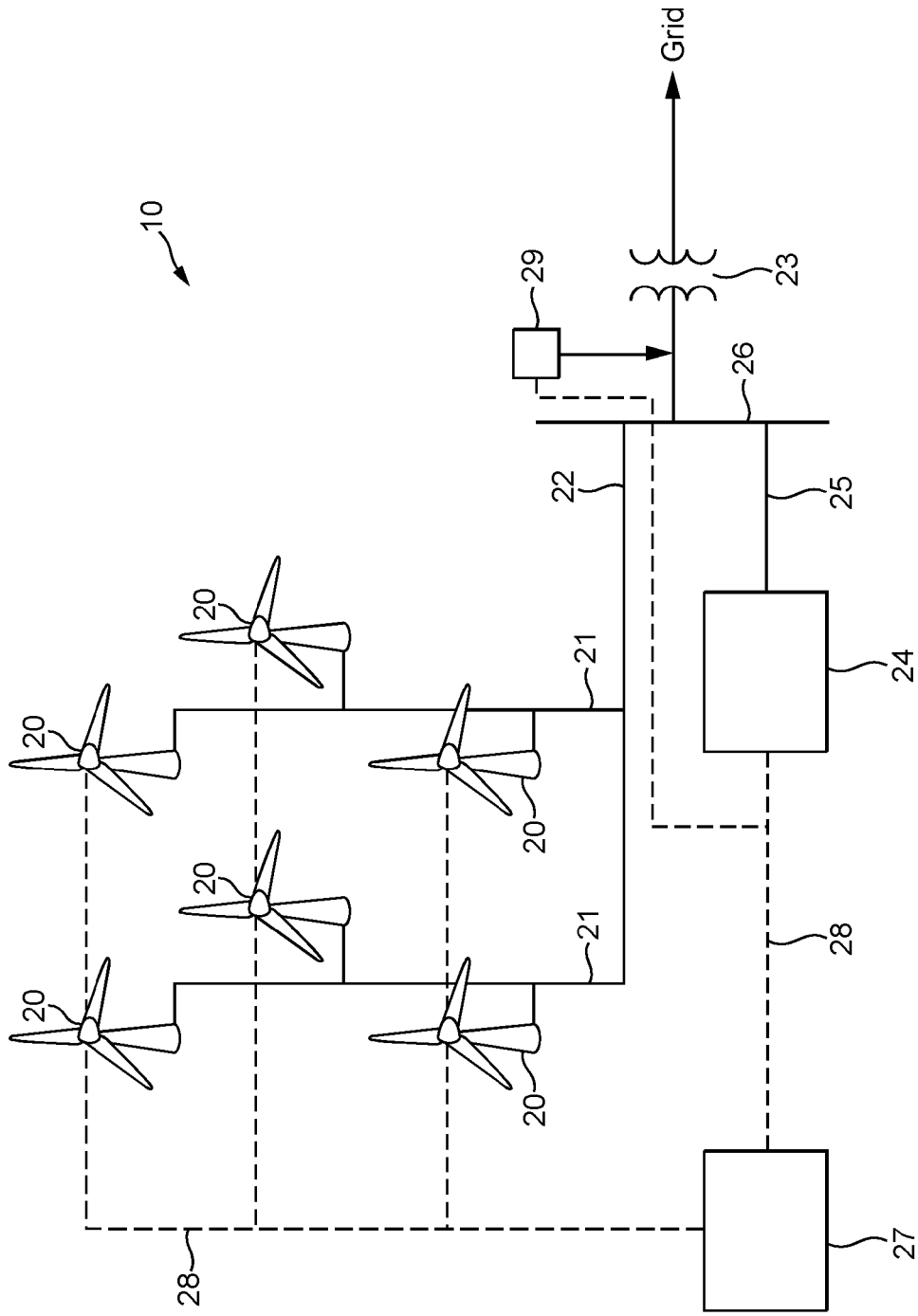
FIG. 2 is a schematic illustration of a wind park according to an example of the invention.

FIG. 2 illustrates a wind park 10 comprising a plurality of wind turbines 20. Wind turbines 20 are coupled via respective branch transmission lines 21 to a main low-voltage transmission line 22. Main transmission line 22 terminates in a wind park transformer 23 which connects the wind park 10 to the grid. Before the wind park transformer 23, an energy storage system 24 (ESS) is connected to the main transmission line 22 via subsidiary transmission line 25. The location where main transmission line 22 and subsidiary transmission line 25 meet is known as the point of common coupling 26. Wind park 10 also comprises a wind park controller 27. The controller 27 is coupled to the energy storage system 24 and to each of the wind turbines 20 in the plurality of wind turbines 20 via wired or wireless data connections 28.

In operation, the wind park controller 27 communicates via the data connections 28 with individual wind turbine controllers in the respective wind turbines 20, thereby receiving sensor data from the wind turbines 20, and issuing control commands to the wind turbine controllers.

The wind park 10 also includes power sensors 29 located on the wind park side of transformer 23 which measure the current and voltage being supplied on the main transmission line 22 to the transformer 23.

The energy storage system 24 is arranged to supplement the power output from the wind park at times of increased demand, and store excess energy when demand is low. The energy storage system comprises one or more energy storage devices, a diagnostic system comprising one or more sensors for determining at least the charge stored in the storage devices, and a controller for communicating with the wind park controller 27 to exchange diagnostic data and storage system control instructions. The one or more energy storage devices can be provided as batteries, as chemical based storage, flywheel based storage, capacitor based storage, thermal energy storage, gravitational energy storage, compressed energy air storage, Hydrodynamic or Magnetohydrodynamic based storage. Other energy storage systems are also possible, as will be appreciated by the person skilled in the art.

Figure 3:
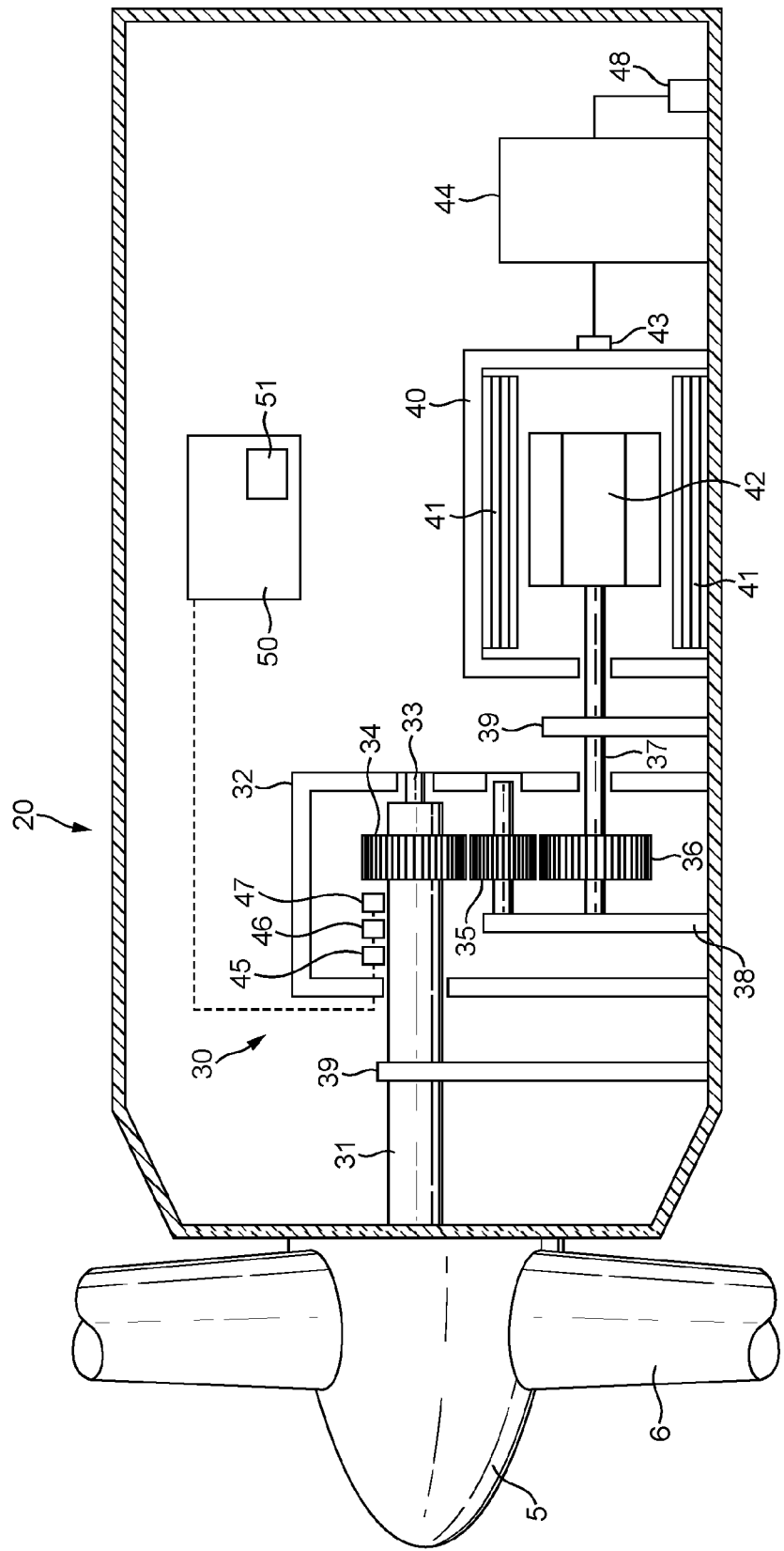
FIG. 3 is a schematic illustration of a nacelle interior and gear box according to an example of the invention.

FIG. 3 illustrates the interior of the wind turbine nacelle 3 in more detail. Drive train assembly 30 comprises a low speed drive shaft 31 that connects the rotor hub 5 to a gearbox housing 32 located in the nacelle 3. The low speed drive shaft 31 is provided with a bearing 33 at its end by which it is rotatably supported in the gear housing 32. Located near the end of the shaft 31 is a gear wheel 34 by which a connection to an optional adjacent secondary gear wheel 35 is made. Secondary gear wheel 35 in turn connects to a gear wheel 36 mounted on or integral with the generator rotor shaft 37. An intermediate gearbox bushing 38 may be provided to support the adjacent gear wheel 35 and the gear cog 36 in the gearbox housing 32, or these may simply be supported by the housing itself. Bushings 39 may also be provided to support the low speed drive shaft 31 and the generator rotor shaft 37.

Generator 40 is provided adjacent the gearbox housing 32, and comprises a stator 41 and a rotor 42. Both stator 41 and rotor 42 are provided with electrical windings, which are energised in order to create interlinking electrical and magnetic flux. The generator rotor shaft 37 is coupled to the rotor 42 so that it is caused to turn within the stator 41 under the influence of the drive shaft 31 and the motion of the rotor hub 5. As is known in the art, the electrical windings on the stator 41 are energised with an electrical current to create a rotating magnetic field in which the electrical windings on the rotor turn thereby creating an electrical current for output at electrical terminal 43.

Output electrical terminal 43 supplies the alternating electrical current produced by the generator to power conditioning apparatus 44. For variable speed wind turbines, the power conditioning apparatus includes an inverter, which converts the varying alternating current (AC) output from the generator 40 to a direct current (DC), and back to an AC alternating current at the appropriate frequency and voltage for input to the transmission grid. For constant speed wind turbines a direct connection to the grid may be made without the use of an inverter.

The turbine 20 is also provided with a wind turbine controller 50 for receiving signals from sensors mounted in the nacelle 3 (see below), for providing control signals to the generator 40 and for communicating with the wind park controller 27. Controller 50 has memory 51 for storing data and control algorithms, a processor for carrying out the control algorithms, as well as a transceiver, for sending and receiving data from and to the wind park controller 27.

According to this example of the invention, the wind turbine 20 also contains a number of sensors for determining the operational state of the gearbox 32. Rotary torque transducer 45 is coupled to the low speed drive shaft to determine the torque applied by the wind turbine hub to the gear train assembly 34, 35 and 36. Similarly, speed sensor 46 and vibration sensor 47 are also coupled to the drive shaft to measure the drive shaft rotational speed w, and the magnitude of any gearbox vibrations. The speed sensor 46 can be an accelerometer or a tachometer mounted on the drive shaft 31 itself. It will be appreciated that the sensors described can be provided inside or outside of the gearbox housing 32, as long as they are coupled to the gear train components of interest, and that they may be coupled to the low-speed drive shaft 31 alone or to one or more other components of the drive train assembly 30. Other sensors may also be provided, such as acoustic sensors.

Additionally, the nacelle 3 comprises voltage sensor 48 for determining the voltage at the turbine. The sensor can be provided immediately at the output of the generator 40, after the power conditioning system 44, or as a component of the power conditioning system 44.

Sensors 45, 46, 47 and 48 are connected to the wind turbine controller 50, which stores the sensor data. Common relay and speed sensors are used to transmit the data.

Figure 4:
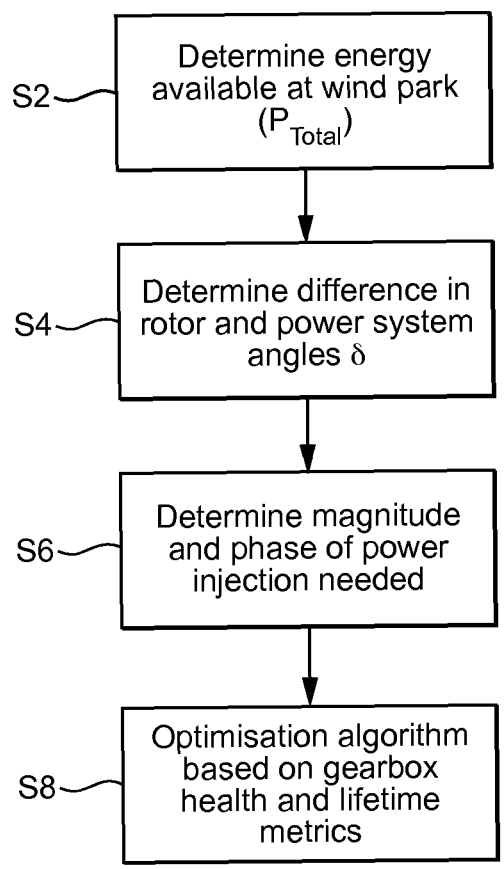
FIG. 4 is a flow chart illustrating a control algorithm for a wind park controller.

Operation of the wind park controller 27 will now be explained in more detail and with reference to FIG. 4, which is illustrative of a schematic control algorithm. As will be appreciated aspects of the control algorithm may be embodied in software or hardware o or both.

In step S2, the controller determines the total power available to the wind park 10. The total power will be a function of the power supplied by the wind at each of the wind turbines, and converted into electrical power by the respective generators, as well as the power that is available in terms of stored charge in the energy storage system 24.

The mechanical power provided by the wind turbine is transmitted from the drive shaft 31 to the generator rotor 42 via the gear box 32, and is a function of the torque provided by the wind on the rotating shaft and the shaft's rotational velocity. The mechanical power $P_m$ applied to the generator is therefore is given by the equation 1:

$$P_m = w \cdot T_m \quad \text{(Equation 1)}$$

Where w is the speed of the low speed shaft measured by speed sensor 46 and $T_m$ is the torque applied by the shaft 31 to the gear train assembly measured by rotary torque transducer 45. It will be appreciated that the rotary torque transducer 45 and speed sensor 46 could also be placed on the generator rotor shaft 37 in which case w and $T_m$ in the expression for $P_m$ would instead measure the rotational velocity of shaft 37 and the torque applied to the rotor 42. For each wind turbine 20 in the wind park 10, the mechanical power applied to the rotor is therefore transmitted to the wind park controller 27.

Additionally, the amount of electrical power $P_{ES}$ stored in the energy storage system 24 is also determined by the ESS diagnostic system and transmitted to the wind park controller 27. The total amount of power available for the wind park system is then calculated from the expression:

$$P_m \text{ (from the plurality of wind turbines)} + P_{ES} = P_{total}$$

In step S4, the sensor outputs from nacelle voltage sensor 48 and PCC voltage sensor 29 are received at the controller 27 and used to determine the power system angle of the plurality of generators 40 in the wind park. The power system angle δs (the angle between the generator terminal voltage and the internal voltage of the machine) can be calculated from equation 2:

$$P_{Total} = \frac{V_{PCC} \cdot V_t}{X_g} \cdot \sin\delta s \quad \text{(Equation 2)}$$

Where $P_{Total}$ is total electrical power of the system calculated in Equation 1, $V_{PCC}$ is the voltage measured by sensor 29 at the Point Of Common Coupling 26, $V_t$ is the voltage measured at the turbine by sensor 48, and $X_g$ is the reactance of the generator. The reactance of the generator can also be measured in known fashion by electrical components inside the nacelle, and stored in the memory 51 of the wind turbine controller 50.

The rotor angle $\delta_r$ is often referred to as the rotor torque angle, and is the angle between the direction of rotor magnetomotive force and the direction of stator magnetomotive force. The rotor angle $\delta_r$ of the generator can be calculated in known fashion using a transducer that detects the torque angle of the generator. For example, the transducer can provide a signal indicating the relative rotor position, detected using a photo device, say. This measurement is compared with the terminal voltage reference, and the phase shift indicating the torque angle $\delta_r$ is processed. This signal $\delta_r$ is sent to the wind park controller 27 as a reference signal, where it is summed and averaged with all of the wind turbines that are on line in the wind park. The average of the summed wind turbine angles provides a reference $\theta_r$ to be compared with the power system angle.

The wind park controller 27 compares the relative rotor angle $\theta_r$ with the power system angle δs to determine the difference between the two values. In this application, this difference will simply be referred to as the delta value δ, where $\delta = \delta s - \theta_r$.

In steady state equilibrium, the relative rotor angle $\theta_r$ and the power system angle δs are vector quantities that are equal in magnitude and direction. Additionally, the phase of the input mechanical power and of the output electrical power are equal. However, disturbances in the grid-generator system that may arise from sudden changes in the load at the grid, for example, will result in a change in the electrical power output from the generator and a consequential imbalance between the input mechanical power and the output electrical power. The electrical power output can change rapidly, but the mechanical power input into the generator by the rotating drive shaft cannot. As a result of this difference in power, there will be a difference in torque applied to the drive shaft 31 causing it to accelerate or decelerate. As the rotor changes speed, the relative rotor angle $\theta_r$ therefore changes with respect to the power system angle $\delta s$.

Although this is determined for a single generator, the difference in rotor angle will be identical for all of the wind turbine generators in the wind park 10 as they are coupled and operate in synchronisation based on the power system conditions prevalent at the time.

Having detected the difference between $\theta_r$ and $\delta s$, the wind park controller 27 therefore determines whether or not to inject power into the wind park main transmission line at the point of common connection 26 to provide stabilise the generators, and reduce the imbalance between the rotor angle and the power system angle. Advantageously, this will have the effect of reducing the dynamic torque on the drive shaft 31, and therefore the strain on the gear assembly.

The principle behind power stabilisation based on injected power is well known. A difference in the relative rotor angle $\theta_r$ and power system angle $\delta s$ is indicative of a swing in the power system, in other words, a mechanical or electrical disturbance resulting from a system imbalance. The imbalance can however be readily dampened by injection of power in equal but opposite phase to the difference in phase between $\theta_r$ and $\delta s$. This essentially restores equilibrium.

The wind park 10 with controller 27 and Energy Storage System 24 can be advantageously used to stabilise the generator of the wind turbine by injecting real or active power at the Point of Common Coupling 26. In comparison to traditional generators that use a power system exciter to change the reactive power output (VAR) of the machine but are slow to adjust the real or active power, the power injection from the Energy Storage System can take place much more quickly.

The amount of power to be added at the point of common connection 26 is calculated from the Swing Equation, equation 3.

$$\frac{2H}{w}\frac{d^2\delta}{dt} = P_m - P_e[+P_{inj}] \quad \text{(Equation 3)}$$

Where $P_m$ is the mechanical power available to the wind park system 10 from the respective individual wind turbines (see equation 1), $P_e$ is the electrical power measured at the sensor 28 or from the respective nacelle sensors 48, and is equal to $P_{total}$ and, H is the inertia constant, w is the rotational velocity of the shaft and $\delta$ is the difference between $\theta_r$ and $\delta s$.

The expression on the left hand side of the equation is equal to the accelerating power (Pa), and can be calculated once the shaft speed w and the rate of change of delta $\delta$ is known. In order to dampen the power, it is desired to adjust $\theta_r$ and $\delta s$ so that they are equal to one another, and as far as possible, keep the accelerating Power (Pa) constant. $P_m$ will vary as the speed of the rotating drive shaft and the torque on the shaft vary, while $P_e$ will vary according to variations on the grid. Thus, at any given time, $P_e$ measured at the turbine will be too low or too high to maintain a balance with $P_m$, and an injection of electrical power $P_{inj}$ will be needed to compensate.

In the opposite case, it may be necessary for the Energy Storage System 24 to absorb energy from the system in order to compensate. As the plurality of wind turbines are coupled to one another, the operation of the wind park system as a whole can therefore be stabilised by instructing the energy storage system 24 to absorb power from the main transmission line 22, or by injecting power into the main transmission line 22, in order to reduce wear and tear on the gear assembly and transmission system.

In step S6, the phase and magnitude of the power injection $P_{inj}$ required from the energy storage system 24 is calculated by the controller 27. If the power required $P_{inj}$ is below a threshold value, then the controller may choose to take no action for the present time and simply continue to monitor the system. If however, the magnitude of the power required is greater than the minimum threshold, then the controller must determine how to regulate the power injection from the energy storage system 24 in order to stabilise the system. The controller 27 can instruct the energy storage system 24 to inject power into the point of common coupling by sending a power reference signal $P_{ref}$ to the energy storage system 24 on data connection 28.

As is known in the art, pitch control is also used to stabilise power system imbalances, in addition to the injection of electrical power. The wind turbine controller 50 therefore routinely operates to pitch the blades of the wind turbine so as to increase or decrease the torque on the low-speed shaft 31. This has the effect of changing the mechanical power $P_m$ applied to the generator and therefore also has a role to play in the stabilisation of the generator, and reduction of wear on the gearbox 32 and gear train assembly. Information describing the pitch control commands issued to the pitch control system is therefore routinely transmitted to the wind park controller 27 by the respective wind turbine controllers 27. The pitch control commands may also be used to ramp up or ramp down the power output from the wind turbines in order to meet power demands from the utility operator or in order to match grid fluctuations.

The wind park controller 27 stores in memory a data time series for each of the sensor data variables received from the respective wind turbine controllers 50. The controller 27 also stores for each wind turbine the history of control signal data and other parameters describing the operation of the wind turbines. These may include the pitch control data mentioned above, as well as wind turbine brake commands, and start-up or shut-down commands for example.

It will be appreciated that during the operation of the wind park, individual wind turbines may be pitched into or out of the wind more than other wind turbines, or that particular wind turbines may be shutdown or caused to idle in readiness for providing spinning reserve. Each time a control signal is issued by the controller 50 or 27 to effect pitch control, or to a wind turbine brake for example, the mechanical loading on the drive shaft and gear box assembly will change and the torque on the shaft will therefore be increased. Over prolonged periods of time, such operations can lead to a reduction in the operating life of the wind turbine, as well as differences in lifetime between wind turbines in the same wind park. Shutting the entire wind park 10 off in order to repair or carry out maintenance on a single wind turbine is expensive.

The data from the sensors is combined in the controller 27 in order to provide a metric or indication of the current health of the gearbox, and is also extrapolated into an indication of expected gearbox lifetime. This is possible as the gearbox and the gear train assembly are rigorously tested before implementation and expected operational parameters for the gearbox can be identified in advance of use. A simple indication of gearbox health for example could be based on measurements of torque between the different gear train components. For safe operation, the torque would necessarily remain within predetermined operational bounds, and an unhealthy gearbox condition would then be associated with moments when the torque exceed these predetermined bounds. Furthermore, to the extent that the torque exceeded such bounds, the rated lifetime of the gearbox would be shortened by an amount that could be estimated from an algorithm.

Other parameters could also be used in a metric or index of gearbox health. For example a high volume acoustic signal or a high magnitude signal from the vibration sensor 20 indicates that the gearbox is not operating smoothly, and so will have a negative impact on the gearbox health metric. Comparison of data from respective speed or positional sensors in the gearbox may also indicate that the gear train assembly is not operating cohesively, such as if the position of the gear train components is outside of predetermined bounds, or if the relative speeds between the components are also outside of certain bounds. Temperature data and strain data of gearbox or drive train components could also be used.

The stored pitch control data, brake commands and start-up or shut-down commands for each of the wind turbines can also be used in the calculation of the gearbox health and drive train metric. Clearly, the more that a wind turbine has been required to operate, the more likely the gearbox and drive train are likely to be affected by wear and tear.

As will be appreciated by the person skilled in the art, data describing one or more of the parameters discussed above can be combined in the controller 27 (or indeed in the wind turbine controllers 50) into a metric describing the gearbox or drive train health. Combination of multiple parameters could be by via straightforward mathematical operators (addition subtraction, multiplication, division etc), by more sophisticated algorithms in which certain parameters are weighted to reflect their importance in respect to others, or via self learning algorithms such as neural networks that are programmed on receipt of a number of inputs to output one or more values. Other techniques are also possible, and the discussion here is intended only to be illustrative rather than limiting.

The aim of the wind park controller 27 is to regulate both the power flow to or from the energy storage system 24 to the Point of Common Coupling 26, and the pitch control commands issued by the respective wind turbine controllers 50. In order to achieve this, the controller 27 must balance a number of competing requirements. First, the controller 27 must monitor the connection between the wind park 10 and the grid, and ensure that the energy storage system 24 supplies power to meet any grid-side power demands that cannot be met by the wind turbines 20 alone. Second, the controller 27 must control the energy storage system 24 so that it is charged and ready for use. This operation essentially requires the controller 27 to instruct the wind turbines 20 to produce power in excess of the current demand of the grid, so that any excess can be absorbed by the energy storage system. In both of these operations the controller 27 controls the individual wind turbines using respective pitch control commands to ramp up or down the wind turbine power output (ramp control). At the same time, the controller 27 must operate to reduce the wear and tear on the gear train assemblies of the respective wind turbines 20, considering the potentially detrimental effects on the gearbox health and lifetime metrics, each time pitch control occurs, and each time there is an imbalance in mechanical and electrical power at the generator. To address this last problem, the controller 27 uses the energy storage system 24 to provide a power stabilisation effect at the wind park 10. The controller 27 also considers which of the plurality of wind turbines 20 in the wind park 10 are to be operated to meet the ever changing energy demands of the grid based on the data history for each of the wind turbines and respective gearbox health metrics.

In step S8, therefore, in order to balance these competing requirements, the controller 27 operates using an optimisation algorithm, based on the various data parameters received from the wind turbine controllers 51. This will be described in more detail later. In the algorithm, the aim is to maximise the gearbox health and lifetime metrics within the operational constraints of the wind park-grid system. In use of the algorithm, it can be helpful to divide the wind turbines 20 in the wind park into a number of different groups and operates all wind turbines in the same group in the same way.

Figure 5:
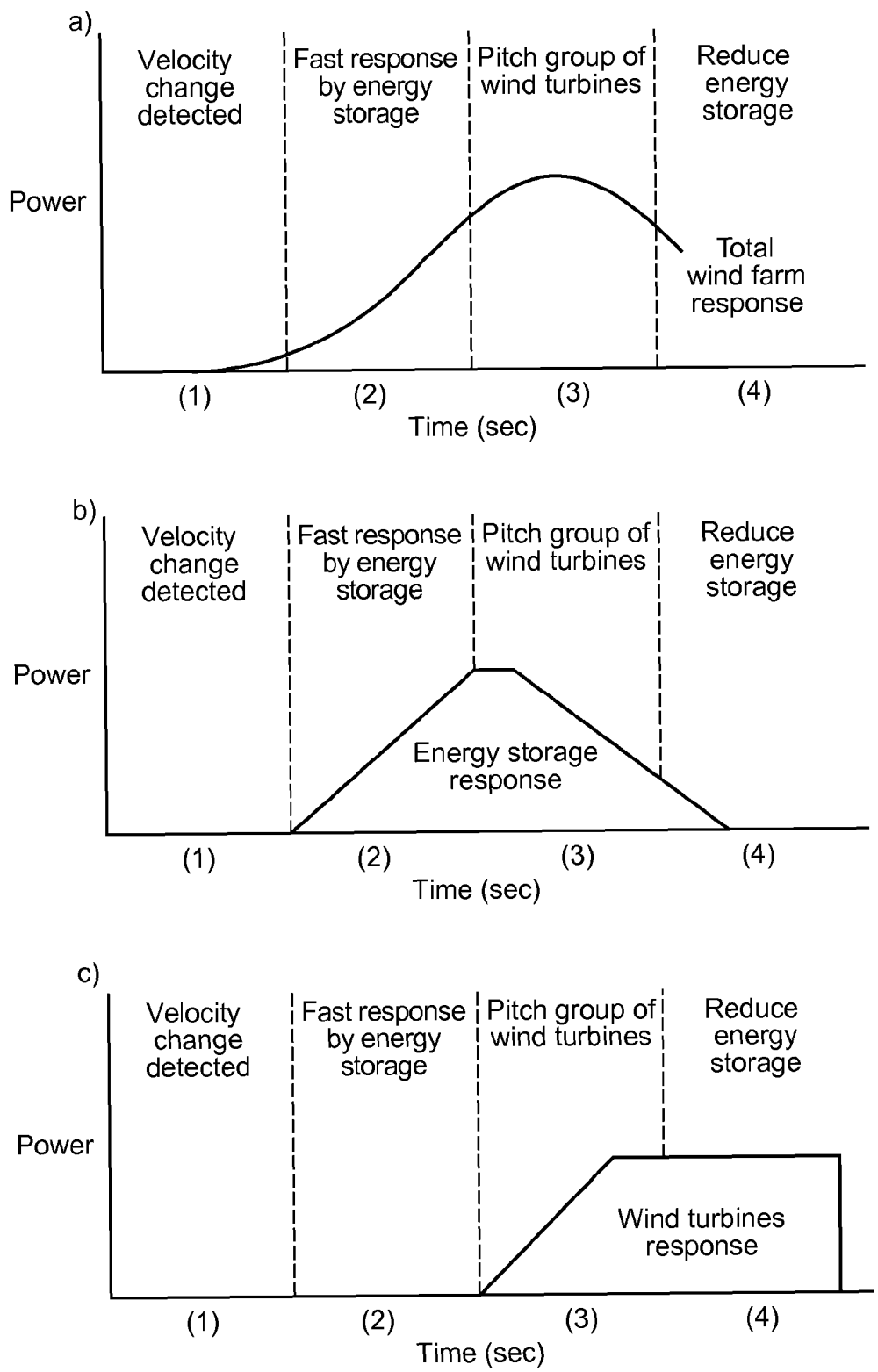
FIG. 5 is an illustration of an example control regime for controlling the input/output of an energy storage device, and pitch control of respective wind turbines.
Figure 6:
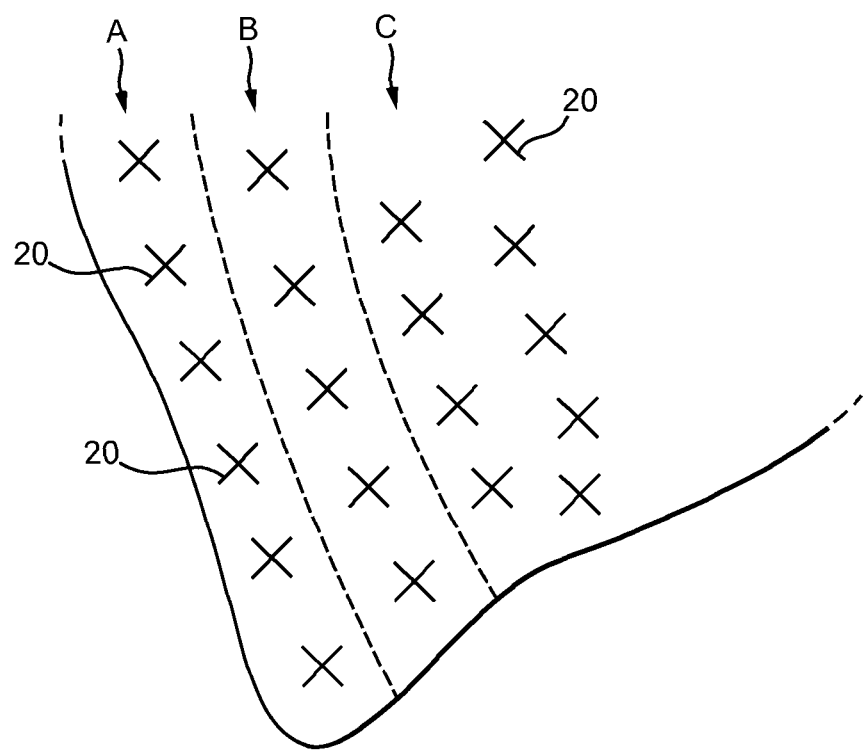
FIG. 6 is illustrative of a wind park divided into separate groups of wind turbines, A, B and C.

FIG. 5 for example, shows a pitch and energy control regime for a group of wind turbines. This control regime uses the energy storage system response to provide a soft start and stop for wind turbine pitch control, thereby mitigating the operational stress on the gearbox. The group is a subset of the wind turbines 20 making up the wind turbines in the wind park 10, and may for example represent those wind turbines that by virtue of their location are more likely to be on the wind ward side of the wind park 20, and therefore subject to greater loads from the wind. A further group of wind turbines may for example represent the wind turbines one row deep into the wind park 10, and a further group may represent those wind turbines on the leeward side of the wind park 10 that are subject to less strong winds and therefore less operational stress. FIG. 6 for example illustrates a possible zoning of a wind park into groups of wind turbines with this in mind, in which Group A represents the wind ward group of wind turbines, Group C the leeward wind turbines, and Group B intermediate turbines. In other embodiments, a group of wind turbines can consist of a single wind turbine.

Referring to FIG. 5, the response of the wind park as a whole can be categorised into four distinct regimes, (1), (2), (3) and (4). In the first regime, the wind park controller 27 detects a disturbance in the power stability ($\delta=\theta_r,-\delta s$) and calculates the desired power response $P_{inj}$ as described above. A proposed response is illustrated in FIG. 5b). In the second regime, the controller 27 sends power control signals ($P_{ref}$) to the energy storage system 24 to control the power injection at the Point of Common Control 26. This action must be carried out in addition to operation of the energy storage system to meet grid based demands for power. The profile of the energy storage device response illustrated in FIG. 5b) indicates that the magnitude of the power response from the energy storage device 24 generally increases over this control regime, and as a result the total power input to the system (illustrated in FIG. 5a) begins to rise.

Although the wind park controller 27 and the controller 50 of the respective wind turbines send control signals to activate the pitch of the respective wind turbine wind turbine blades, the effect of pitch control (increased torque and mechanical power available at the generator) will not be available as quickly as the response from the energy storage device 24. Thus, even assuming a relatively immediate pitch control command is issued, the power from the pitch control operation will not be available until after the energy storage device has already commenced injecting power. This is illustrated in the third operational regime (3), in which the power from the wind turbine pitch control for that group becomes available. At this stage, the comptroller may choose to scale back the power flow between the energy storage device and the point of common connection if the power from the pitch control is sufficient. As a result, the total power available in the third operational regime (3) is shown as reaching a peak and then beginning to decline as the wind turbine response takes over. As shown in FIG. 5c) the wind turbine response is limited by the magnitude by which the pitch of the wind turbine blades can be changed.

The profile of the energy storage device response shown in FIG. 5b) is critical to increasing the lifetime of the gearbox and gear train assembly. First, the availability of the power from the energy storage device means that the necessary pitch control response can be smaller than would have otherwise been necessary if no energy storage device was present and can also be more gradual, thereby reducing actuation overhead. Furthermore, the longer the energy storage system can provide power to the Point of Common Coupling 26 to regulate any imbalance, the less ramping of the wind turbines is needed to supply the additional mechanical or electrical power.

In theory, different optimal energy storage device responses may be appropriate for each of the groups A, B and C discussed above. For example, as the wind turbines in group A are subject to more operational strain and are likely to have a lower gearbox health metric, optimal use of the energy storage device to reduce gearbox wear and tear may mean quicker and sustained absorption or supply or power by the energy storage device in comparison to the wind turbines in group C for example. For the group C wind turbines, the operational strain is less, and use of power regulation by the energy storage device may be less of a necessity than for the group A wind turbines.

As the power supplied or absorbed by the energy storage system affects the power characteristic of the wind park as a whole, controlling the energy storage profile in regimes (1) and (2) will be based on an overall assessment of the gearbox health and lifetime metrics taken over each of the groups.

As noted above, the controller 27 will also issue pitch control commands to the nacelle controllers 50 of each of the respective wind turbines in each of the groups A, B, and C. For example, where energy storage device capacity is available, the pitch control commands for the wind turbines in group A may be diminished in order to reduce the wear and tear and improve the gearbox lifetime.

In this example, therefore, the variables used in the optimisation algorithm for the controller include the instantaneous power supply/absorption capacity of energy storage system 24, the gearbox health metric (based on sensor data and historical values), the gearbox lifetime metric (based on sensor data and historical values), pitch control and other operational history data for the respective wind turbines, and Pref and Qref data from sensor 29 indicating the grid power requirements. It may also include an optional health metric of the energy storage device.

Furthermore, the constraints on the system include for example the maximum amount of power that can be absorbed/supplied by the energy storage system 24, the speed of response of the storage device, and pitch actuators, as well as the grid electrical response characteristics.

The variables and constraints received from the sensors are discretized to form a time series of n samples. In this example, a length for the time series of a few seconds with a sampling speed of 0.1 s, corresponding to around 30 discrete samples, has been found to be sufficient, although in other situations longer or shorter sampling windows may be preferred.

The optimisation routine is then run over the n samples to produce a sequence of charge or discharge commands for the energy storage system and pitch control commands for a future period of time. The optimisation goal for the algorithm is to maximise the gearbox health or lifetime metric.

The commands are based on the availability of wind turbines and the remaining energy stored in the energy storage device. In this way, the sequence allows for rapid changes in both the wind gust and transmission grid to be dampened by the controller 27.

The optimisation algorithm can be based on an inherent model mapping the input and output parameters and their relationships to one another. The generation of an optimal future time series of control signals is then carried out by the optimisation algorithm based on a cost function analysis of future control parameters according to the model. In one embodiment, the optimisation algorithm can include an adaptive training and control function for updating the model, based on errors between the calculated and actual control parameters and expected wind turbine response.

The model could for example be a linear Controlled Auto-Regressive Integrated Moving Average (CARIMA) model, and a Multiple Model Recursive Least-Squares (MMRLS) on-line parameter estimator can then be used as the adaptive training and control block to update the CARIMA model coefficients. The optimisation algorithm could however make use of a non-linear model such as Non-linear ARX (auto-regressive with exogenous disturbance model), and NARMAX (non-linear auto-regressive with moving average and exogenous disturbance model), Hammerstein, Weiner and Volterra Models, Bi-linear models, neural networks, fuzzy sets, as well as FAST (Fatigue Aerodynamics and Structural Dynamics Model) and VTS codes (a proprietary turbine modelling code based on FLEX5 provided by Vestas). Where non-linear models are used, general optimiser techniques need to be used to solve for the control signals. Other implementations will be apparent to the skilled person, with the focus being the selection of a model structure that provides good predictions while being computationally tractable.

The response of the energy storage system 24 is of course also constrained by the amount of charge stored on the energy storage device and the amount of power that can be provided. Assuming that the capacity of the energy storage device is always sufficient to meet any power imbalance at the grid, the response of the energy storage device may simply be operated to supply or absorb its maximum response at all times. In practice however this will not be possible, and it will be necessary to make a compromise in the power response that is made.

The gearbox health and lifetime metrics are also used by the controller 27 to determine which wind turbines are dispatched to provide power to meet increased demand at the grid. For example, rather than issuing the same dispatch command to the entire wind park to ramp up power, the controller 27 may send the command only to one of the groups A, B or C identified above. Furthermore, the selection of the group can be based on which of the wind turbines have the longest remaining gearbox lifetimes. This may be done on a group or an individual basis.

A wind park controller and control method for a wind park has therefore been described above. The wind park comprises a plurality of wind turbines and an Energy Storage System connected to one another by means of a low voltage power network which is in turn coupled to the grid. The controller determines a number of operating parameters of the wind turbine gearbox or drive train, and calculates a gearbox or drive train health metric. This can include a measure of the gearbox lifetime. The controller also determines one or more power characteristics of the wind turbine generator or the point of common coupling to determine a power mismatch indication. Based on the power mismatch indication and said gearbox or drive train health metric, the controller determines a power command for the Energy Storage System and wind turbines based to improve the gearbox health and lifetime.

The examples described above are intended only to be illustrative and not to limit or restrict the invention defined in the following claims. In particular, it will be appreciated that the features of separate example embodiments of the invention may be used equally in other examples embodiments.

The invention claimed is:

1. A wind park control system for a wind park, the wind park comprising a plurality of wind turbines and an energy storage system connected to one another by means of a low voltage power network, wherein the low voltage power network is coupled to an electrical grid, and wherein each wind turbine of the plurality of wind turbines respectively comprises a drive train and a gear box connected between a rotor of the wind turbine and a generator of the wind turbine, and wherein each wind turbine of the plurality of wind turbines is assigned to a group selected from a plurality of groups, the wind park control system comprising:
   one or more environmental sensors located in at least a first wind turbine of the plurality of wind turbines, the one or more environmental sensors arranged to determine one or more operating parameters associated with the respective drive train or gear box of the first wind turbine;
   one or more power sensors arranged to determine a power mismatch indication between the generator of the first wind turbine and the low voltage power network; and
   a controller adapted to;
      determine, based on applying the one or more operating parameters to a predefined algorithm, a health metric associated with the drive train or gear box of the first wind turbine;
      assign, using the health metric, the first wind turbine to a first group selected from the plurality of groups; and
      determine, based on the power mismatch indication and the health metric, a first power command for the energy storage system and a plurality of second power commands for individual wind turbines of the plurality of wind turbines that are assigned to different groups of the plurality of groups,
      wherein individual second power commands of the plurality of second power commands are determined based on which group of the different groups that a corresponding individual wind turbine is assigned to.

2. The wind park control system of claim 1, wherein the one or more operating parameters includes at least one of: torque data, acoustic data, vibrational data, speed data, position data, strain data, and temperature data of one or more components of the drive train or gear box.

3. The wind park control system of claim 1, wherein the controller comprises a memory storing one or more historical time sequences for the first wind turbine, the one or more historical time sequences comprising at least one of: pitch control commands, wind brake commands, start-up commands, and shut-down commands, and wherein determining the health metric is based on the one or more historical time sequences.

4. The wind park control system of claim 1, wherein the health metric includes an estimation of gearbox lifetime.

5. The wind park control system of claim 1, wherein the power mismatch indication is expressed as a delta angle, the delta angle equal to the difference in a rotor angle of the generator and a system phase angle of the low voltage power network.

6. The wind park control system of claim 5, wherein the first power command for the energy storage system is determined such that the delta angle is restored to a zero value.

7. The wind park control system of claim 1, wherein determining a second power command for one or more of the plurality of wind turbines is based on an available power from the energy storage system and the health metric.

8. The wind park control system of claim 7, wherein the controller stores a respective health metric for each wind turbine of the plurality of wind turbines, and wherein the controller is further adapted to:
   issue power reference commands to respective wind turbines of the plurality of wind turbines based on the respective health metric.

9. A method of controlling a wind park, the wind park comprising a plurality of wind turbines and an energy storage system connected to one another by means of a low voltage power network, wherein the low voltage power network is coupled to an electrical grid, wherein each wind turbine of the plurality of wind turbines respectively comprises a drive train and a gear box connected between a rotor of the wind turbine and a generator of the wind turbine, and wherein each wind turbine of the plurality of wind turbines is assigned to a group selected from a plurality of groups, the method comprising:
   determining one or more environmental operating parameters associated with the respective drive train or gear box of a first wind turbine of the plurality of wind turbines;
   determining a power mismatch indication between the generator of the first wind turbine and the low voltage power network;
   determining, based on applying the one or more operating parameters to a predefined algorithm, a health metric associated with the drive train or gear box of the first wind turbine;
   assigning, using the health metric, the first wind turbine to a first group selected from the plurality of groups; and
   determining, based on the power mismatch indication and the health metric, a first power command for the energy storage system and a plurality of second power commands for individual wind turbines of the plurality of wind turbines that are assigned to different groups of the plurality of groups,
   wherein individual second power commands of the plurality of second power commands are determined based on which group of the different groups that a corresponding individual wind turbine is assigned to.

10. The method of controlling a wind park of claim 9, wherein the one or more environmental operating parameters includes at least one of: torque data, acoustic data, vibrational data, speed data, position data, strain data, and temperature data of one or more components of the drive train or gear box.

11. The method of controlling a wind park of claim 9, further comprising:
storing one or more historical time sequences for the first wind turbine, the one or more historical time sequences comprising at least one of: pitch control commands, wind brake commands, start-up commands, and shut-down commands,
wherein determining the health metric associated with the drive train or gear box of the first wind turbine is based on the one or more historical time sequences.

12. The method of controlling a wind park of claim 9, wherein the health metric includes an estimation of gearbox lifetime.

13. The method of controlling a wind park of claim 9, wherein the power mismatch indication is expressed as a delta angle, the delta angle equal to the difference in a rotor angle of the generator and a system phase angle of the low voltage power network.

14. The method of controlling a wind park of claim 13, wherein the first power command for the energy storage system is determined such that the delta angle is restored to a zero value.

15. The method of controlling a wind park of claim 9, wherein determining a second power command for one or more of the plurality of wind turbines is based on an available power from the energy storage system and the health metric.

16. The method of controlling a wind park of claim 15, further comprising:
storing a respective health metric for each wind turbine of the plurality of wind turbines; and
issuing power reference commands to respective wind turbines of the plurality of wind turbines based on the respective health metric.

17. A wind park controller storing a computer program for controlling a plurality of wind turbines and an energy storage system connected to one another by means of a low voltage power network, wherein the low voltage power network is coupled to an electrical grid, wherein each wind turbine of the plurality of wind turbines respectively comprises a drive train and a gear box connected between a rotor of the wind turbine and a generator of the wind turbine, and wherein each wind turbine of the plurality of wind turbines is assigned to a group selected from a plurality of groups,
wherein, when the computer program is executed on the wind park controller, the wind park controller is caused to carry out an operation comprising:
determining one or more environmental operating parameters associated with the respective drive train or gear box of a first wind turbine of the plurality of wind turbines;
determining a power mismatch indication between the generator of the first wind turbine and the low voltage power network;
determining, based on applying the one or more environmental operating parameters to a predefined algorithm, a health metric associated with the drive train or gear box of the first wind turbine;
assigning, using the health metric, the first wind turbine to a first group selected from the plurality of groups; and
determining, based on the power mismatch information and the health metric, a first power command for the energy storage system and a plurality of second power commands for individual wind turbines of the plurality of wind turbines that are assigned to different groups of the plurality of groups,
wherein individual second power commands of the plurality of second power commands are determined based on which group of the different groups that a corresponding individual wind turbine is assigned to.

18. The wind park control system of claim 1, wherein the one or more operating parameters comprise a plurality of operating parameters that are combined within the predefined algorithm.

* * * * *